(12) United States Patent
Feng

(10) Patent No.: US 9,842,172 B2
(45) Date of Patent: *Dec. 12, 2017

(54) METHOD, CLIENT DEVICE AND SERVER OF ACCESSING NETWORK INFORMATION THROUGH GRAPHIC CODE

(71) Applicant: Alibaba Group Holding Limited, Grand Cayman (KY)

(72) Inventor: Hua Feng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/480,961

(22) Filed: Apr. 6, 2017

(65) Prior Publication Data

US 2017/0212961 A1 Jul. 27, 2017

Related U.S. Application Data

(63) Continuation of application No. 13/708,724, filed on Dec. 7, 2012, now Pat. No. 9,654,600.

(30) Foreign Application Priority Data

Dec. 9, 2011 (CN) .......................... 2011 1 0409744

(51) Int. Cl.
*G06F 15/16* (2006.01)
*G06F 17/30* (2006.01)
(Continued)

(52) U.S. Cl.
CPC ... *G06F 17/30879* (2013.01); *G06K 7/10722* (2013.01); *G06K 19/06037* (2013.01);
(Continued)

(58) Field of Classification Search
USPC .......... 709/203, 223; 705/17, 7.35; 715/248; 235/375

See application file for complete search history.

(56) References Cited

U.S. PATENT DOCUMENTS 4,884,199 A 11/1989 Boothroyd et al.
5,207,792 A 5/1993 Anderson
(Continued)

FOREIGN PATENT DOCUMENTS

CN 101043643 9/2007
CN 101087356 12/2007
(Continued)

OTHER PUBLICATIONS

Chinese office action from the priority application, Chinese patent application No. 201110409744.5, dated Aug. 18, 2015, 11 pages.
(Continued)

*Primary Examiner* — Tammy Nguyen
(74) *Attorney, Agent, or Firm* — Lee & Hayes, PLLC

(57) ABSTRACT

The present disclosure provides a method, a client device and a server of accessing network information through a graphic code. The method comprises: receiving an access request from a client, where the access request includes information of a graphic code; querying and obtaining, in a server, display information and action instruction that is configured in correspondence with the information of the graphic code in the access request; and performing a corresponding action in the display information according to the action instruction information to obtain an access result of the graphic code. The disclosed method simplifies operations of a user without waiting for the user's step-by-step operation requests, and further simplifies a handling process of the server. In addition, this method of directly returning
(Continued)

an access result of a graphic code to a client fulfills an intention of a publisher of the graphic code.

20 Claims, 18 Drawing Sheets

(51) Int. Cl.
- H04L 29/06 (2006.01)
- G06K 19/06 (2006.01)
- G06Q 30/06 (2012.01)
- G06K 7/10 (2006.01)
- H04L 29/08 (2006.01)
- H04W 88/02 (2009.01)

(52) U.S. Cl.
CPC ... *G06K 19/06112* (2013.01); *G06Q 30/0633* (2013.01); *H04L 67/42* (2013.01); *H04L 67/306* (2013.01); *H04W 88/02* (2013.01)

(56) References Cited

U.S. PATENT DOCUMENTS

| | | | |
|---|---|---|---|
| 6,717,686 B1* | 4/2004 | Farros | G06F 3/1205 358/1.1 |
| 7,066,813 B1 | 6/2006 | Sakarnoto et al. | |
| 7,123,740 B2 | 10/2006 | McKinley | |
| 7,401,057 B2 | 7/2008 | Eder | |
| 7,646,294 B2 | 1/2010 | Kow et al. | |
| 7,985,131 B2 | 7/2011 | Okada | |
| 8,245,157 B2 | 8/2012 | Kelly | |
| 8,260,882 B2 | 9/2012 | Kim et al. | |
| 8,286,104 B1 | 10/2012 | Longe-Male | |
| 8,296,477 B1 | 10/2012 | Polk | |
| 8,312,168 B2 | 11/2012 | Rhoads et al. | |
| 8,508,472 B1 | 8/2013 | Wieder | |
| 8,866,699 B2 | 10/2014 | Roth | |
| 9,100,494 B1 | 8/2015 | Rao | |
| 2002/0132213 A1* | 9/2002 | Grant | G09B 5/00 434/322 |
| 2002/0183107 A1 | 12/2002 | Wolfe | |
| 2003/0120681 A1* | 6/2003 | Baclawski | G06F 17/3066 |
| 2004/0046014 A1* | 3/2004 | Russell | G06F 17/30879 235/375 |
| 2004/0220850 A1 | 11/2004 | Ferrer et al. | |
| 2006/0036502 A1 | 2/2006 | Farrell | |
| 2006/0048051 A1* | 3/2006 | Lazaridis | G06F 17/30905 715/248 |
| 2007/0181691 A1 | 8/2007 | Chang | |
| 2007/0192672 A1 | 8/2007 | Rhoads et al. | |
| 2008/0174485 A1 | 7/2008 | Carani et al. | |
| 2009/0144164 A1* | 6/2009 | Wane | G06Q 20/10 705/17 |
| 2009/0179860 A1 | 7/2009 | Wang et al. | |
| 2010/0107092 A1 | 4/2010 | Kindberg | |
| 2010/0287001 A1 | 11/2010 | Pearce et al. | |
| 2011/0010658 A1 | 1/2011 | Nash et al. | |
| 2011/0195663 A1 | 8/2011 | Sakai et al. | |
| 2012/0053992 A1* | 3/2012 | Erol | G06Q 30/0206 705/7.35 |
| 2012/0104084 A1 | 5/2012 | Wang et al. | |
| 2012/0206357 A1 | 8/2012 | Vandeputte | |
| 2012/0243729 A1 | 9/2012 | Pasquero | |
| 2012/0325902 A1 | 12/2012 | Goyal et al. | |
| 2013/0016128 A1 | 1/2013 | Bhatt | |
| 2013/0031506 A1 | 1/2013 | Diaz et al. | |
| 2013/0110302 A1 | 5/2013 | Ferlitsch et al. | |
| 2013/0198036 A1 | 8/2013 | Pappas et al. | |
| 2013/0328786 A1 | 12/2013 | Hinckley | |
| 2013/0339075 A1 | 12/2013 | Kisin et al. | |
| 2013/0339877 A1 | 12/2013 | Skeen et al. | |
| 2014/0108971 A1 | 4/2014 | No et al. | |
| 2014/0344294 A1 | 11/2014 | Skeen et al. | |
| 2015/0007107 A1 | 1/2015 | Guthrie et al. | |

FOREIGN PATENT DOCUMENTS

| | | |
|---|---|---|
| JP | 2008210274 | 9/2008 |
| JP | 2009159188 | 7/2009 |

OTHER PUBLICATIONS

The European Office Action dated Aug. 23, 2016 for European patent application No. 12805871,6, a counterpart foreign application of U.S. Appl. No. 13/708,724, 3 pages.

Translated Japanese Office Action dated Nov. 22, 2016 for Japanese Patent Application No. 2014-546136, a counterpart foreign application of U.S. Appl. No. 13/708,724, 6 pages.

Office Action for U.S. Appl. No. 13/708,724, dated Jan. 22, 2015, Hua Feng, "Method, Client Device and Server of Accessing Network information Through Graphic Code", 7 pages.

Office Action for U.S. Appl. No. 13/708,724, dated Oct. 8, 2015, Hua Feng, "Method, Client Device and Server of Accessing Network Information Through Graphic Code", 7 pages.

Office action for U.S. Appl. No. 13/708,724, dated May 25, 2016, Feng, "Method, Client Device and Server of Accessing Network Information Through Graphic Code", 8 pages.

Office action for U.S. Appl. No. 13/708,724, dated May 6, 2016, Feng, "Method, Client Device and Server of Accessing Network Information Through Graphic Code", 7 pages.

Final Office Action for U.S. Appl. No. 13/708,724, dated Jun. 19, 2015, Hue Feng, "Method, Client Device and Server of Accessing Network Information Through Graphic Code", 8 pages.

Office action for U.S. Appl. No. 13/708,724, dated Aug. 31, 2016, Feng, "Method, Client Device and Server of Accessing Network Information Through Graphic Code", 8 pages.

The PCT Search Report dated Apr. 26, 2013 for PCT application No. PCT/US12/68518, 11 pages.

Translated Japanese Office Action dated Jun. 20, 2017 for Japanese Patent Application No. 2014-546136, a counterpart foreign application of U.S. Pat. No. 9,654,600, 6 pages.

* cited by examiner

Skyring sweater 523005G
Price: 129 dollars
Shipping fee (to all regions of the country): Expedited: 5 dollars, EMS: 22 dollars
Product category: New
Location: Nanjing, Jiangsu Color category: Beige (only a few left), Black (only a few left), Dark gray (only a few left)

METHOD, CLIENT DEVICE AND SERVER OF ACCESSING NETWORK INFORMATION THROUGH GRAPHIC CODE

CROSS REFERENCE TO RELATED PATENT APPLICATIONS

This application claims priority to and is a continuation of U.S. patent application Ser. No. 13/708,724 filed Dec. 7, 2012, entitled "Method, Client Device and Server of Accessing Network Information Through Graphic Code," which claims foreign priority to Chinese Patent Application No. 201110409744.5 filed on 9 Dec. 2011, entitled "Method, Client Device and Server of Accessing Network Information Through Graphic Code," which applications are hereby incorporated by reference in their entirety.

TECHNICAL FIELD

The present disclosure relates to the field of graphics coding technology, and in particular, relates to methods, client devices and servers of accessing network information through graphic codes.

BACKGROUND

A graphic code, such as a 2-dimensional code or barcode, is a new generation encoding technology for recording data symbol information using black-and-white rectangular matrices which are specific geometric graphics regularly distributed on a 2-dimensional surface according to a certain pattern. The graphic code can encode information, such as a website, text, and photos, as a block-shaped barcode picture through a corresponding encoding algorithm. A user can use an image input device or a photoelectric scanning device to decode the information and check corresponding content. A graphic code has characteristics of high information volume, good error correction ability, high reading speed, and comprehensive reading, etc.

A mobile-phone graphic code is an application of the graphics encoding technology in mobile phones. The mobile-phone graphic code corresponds to encoding information which is needed to be accessed and used by a mobile phone into a graphic code, and reading thereof using a camera and a decoding software of the mobile phone. A mobile-phone graphic code may be printed on various forms of printed media such as newspapers, magazines, advertisements, books, packages, business cards, etc. The user can quickly connect to the Internet using the mobile phone by scanning the graphic code with the mobile camera. A process thereof is shown in FIG. 1.

In FIG. 1, a publisher encodes a piece of website information (e.g., a URL) into a graphic code. A mobile phone client 102 first scans the graphic code using a camera thereof, and recognizes the website information in the graphic code 104 using a decoding software. The mobile phone client then invokes a mobile browser to open and access the website 106 via a server 108, thus achieving a quick connection to the Internet.

This method of network accessing through a graphic code can help a user to quickly and effectively browse web pages, download pictures, texts, music, videos, obtain coupons, participate lottery draws, and understand product information of companies, etc, thus eliminating a process of inputting a URL in a mobile phone and achieving an "one-click" Internet access.

However, in practical applications, a publisher has a specific purpose when publishing a graphic code on a selected medium. For example, a product seller prints a graphic code of a particular product on newspapers or magazines with a purpose that users can log in an associated website to purchase the product after viewing thereof. If a certain user desires to make a purchase, he/she needs to scan the graphic code and recognize a website URL using a mobile phone, access the URL by a mobile phone browser, and click buttons of "Add to Shopping Cart" and "Proceed to Checkout" on opened web page(s) to complete online shopping operations. If the user wants to purchase multiple products via mobile-phone graphic codes, he/she needs to repeatedly perform these operations, which are very tedious.

In short, the existing method of network access through a graphic code basically presents website content which directly corresponds to a website URL in the graphic code to a user, and fails to fully realize the publisher's true intention for publishing the graphic code. If the user has any additional needs, additional manual operations are required, which are time consuming.

SUMMARY OF THE DISCLOSURE

The aims of the present disclosure are to provide a method, a client device and a server of accessing network information through a graphic code in order to solve the problems of tedious access operations associated with graphic codes in existing technologies. This Summary is provided to introduce a selection of concepts in a simplified form that are further described below in the Detailed Description. This Summary is not intended to identify all key features or essential features of the claimed subject matter, nor is it alone intended to be used as an aid in determining the scope of the claimed subject matter. The term "techniques," for instance, may refer to device(s), system(s), method(s) and/or computer-readable instructions as permitted by the context above and throughout the present disclosure.

In order to solve the aforementioned problems, the present disclosure discloses a method of accessing network information through a graphic code, which includes:

receiving an access request from a client, where the access request includes information of a graphic code;

querying and obtaining, in a server, display information and action instruction information that is configured in correspondence with the information of the graphic code in the access request; and performing a corresponding action in the display information according to the action instruction information to obtain an access result of the graphic code.

In one embodiment, the server performs the corresponding action in the display information according to the action instruction information to obtain the access result of the graphic code.

In some embodiments, upon querying in the server, the method further includes sending the display information and the action instruction information to the client, and the client performing the corresponding action in the display information according to the action instruction information to obtain the access result of the graphic code.

Additionally or alternatively, the access request of the client further includes information of a login account, and after obtaining the access result of the graphic code, the server stores a correspondence relationship between the access result and the login account.

In one embodiment, the display information is web page information, and the correspondingly configured action instruction information includes at least one of "view", "follow", "add to favorite", and "add to shopping cart".

Additionally or alternatively, the display information is homepage information of a store. If the correspondingly configured action instruction information is "view store's homepage", an action to be performed is to present web page content of the store's homepage. If the correspondingly configured action instruction information is "add to favorite", an action to be performed is to add the store into the favorite. If the correspondingly configured action instruction information is "follow the store's homepage", an action to be performed is to customize related push information of the store's homepage.

Additionally or alternatively, the display information is detailed information of a product. If the correspondingly configured action instruction information is "view product details' page", an action to be performed is to present web page content of the product details' page. If the correspondingly configured action instruction information is "add to shopping cart", an action to be performed is to add the product into the shopping cart. If the correspondingly configured action instruction information is "add to favorite", an action to be performed is to add the product into the favorite.

The present disclosure further provides a method of accessing network information through a graphic code, which includes:

sending, by a client, an access request to a server, where the access request includes information of a graphic code;

receiving display information and action instruction information that is found by the server and corresponds to the information of the graphic code in the access request; and performing, by the client, a corresponding action in the display information according to the action instruction information to obtain an access result for the graphic code.

In one embodiment, the access request of the client further includes information of a login account, and the method further includes sending the access result to the server by the client, and storing a correspondence relationship between the access result and the login account in the server.

In some embodiments, the display information is event page information, and the correspondingly configured action instruction information includes at least one of a touch operation, a gravity sensing operation, and a microphone operation.

Additionally or alternatively, the display information is page information of a scratch lotto, and the correspondingly configured action instruction information is a touch operation in a scratch lotto region. The client receives touch information in the scratch area lotto region and obtains an access result of the scratch lotto's page based on the touch information in the scratch lotto region.

Additionally or alternatively, the display information is page information of a lottery, and the correspondingly configured action instruction information is a gravity sensing operation. The client receives gravity sensing information and an access result of the lottery's page based on the gravity sensing information.

Additionally or alternatively, said display information is page information of a lucky draw, and the correspondingly configured action instruction information is a microphone operation. The client receives microphone information and obtains an access result of the luck draw's page based on the microphone information.

The present disclosure further provides a server of accessing network information through a graphic code, which includes:

an information receiving module used for receiving an access request from a client, where the access request includes information of a graphic code;

a querying module used for querying and obtaining display information and action instruction information that corresponds to the information of the graphic code of the access request in the server; and an action execution module used for performing a corresponding action in the display information according to the action instruction information to obtain an access result of the graphic code.

In one embodiment, the access request of the client further includes information of a login account, and the server further includes a storage module used for storing a correspondence relationship between the access result and the login account in the server after obtaining the access result of the graphic code.

In some embodiments, the display information is web page information, and the correspondingly configured action instruction information includes at least one of "view", "follow", "add to favorite", and "add to shopping cart".

A client device of accessing network information through a graphic code, which includes:

an information sending module used for sending an access request to a server, where the access request includes information of a graphic code;

an information receiving module used for receiving display information and action instruction information that is found by the server and corresponds to the information of the graphic code in the access request; and an action execution module used for performing a corresponding action in the display information according to the action instruction information to obtain an access result of the graphic code.

In one embodiment, the access request of the client further includes information of a login account, and the information sending module is further used for sending the access result to the server to store a correspondence relationship between the access result and the login account in the server.

In some embodiments, the display information is event page information, and the correspondingly configured action instruction information includes at least one of a touch operation, a gravity sensing operation, and a microphone operation.

Compared with existing technologies, the present disclosure has the following advantages:

First, after identifying information (e.g., URL) in a graphic code by a client, the disclosed method further sends the information to the server (not sending through a browser of the client). The server has pre-configured a correspondence relationship of the information in the graphic code with display information and action instruction information, performs a corresponding action according to the relationship to obtain an access result of the graphic code, and returns the access result that corresponds to the graphic code to the client for presentation. Therefore a user does not need to perform step-by-step operations in order to obtain the access result of the graphic code.

For example, in electronic commerce, a configuration set up by a server for a URL in a certain graphic code may be to add a product indicated by the URL to a shopping cart. After a client scans the graphic code, the server returns an access result of "adding to shopping cart" for the graphic code directly to the client to be presented. If a user uses graphic codes to select multiple products, he/she only needs to scan the graphic codes to add all these products directly into the shopping cart and proceeds to checkout thereafter. The user does not need to visit these product details' pages to click buttons of "adding to shopping cart" one after one, as done in the existing technologies.

Therefore, the disclosed method simplifies user operations and increases the speed of obtaining an access result of a graphic code after the user scans the graphic code. Further, the server only needs to perform corresponding operations of pre-configured presentation and action in accordance with information in the graphic code that is sent from the client, without having to wait for step-by-step operation requests from the user as performed in the existing technologies. This also simplifies a processing flow of the server. In addition, this method of directly returning an access result of a graphic code to the client fulfills the intention of a publisher of the graphic code.

Second, the server may send display information and action instruction information that is configured in correspondence with information of a graphic code to the client, which performs a corresponding action according to the action instruction information to obtain an access result for the graphic code.

This method can be used in lucky draw activities. For example, display information sent from the server to the client may be a lucky draw's event page, and corresponding action instruction information may be a touch operation, an accelerometer operation, or a microphone operation. When a user performs a scratch touching operation in a scratch lotto region on a touch screen in accordance with an action instruction, the client directly displays a result of whether the scratch lotto is won. Or, a shaking mobile phone client can obtain a lottery result through an accelerometer. Or, a balloon displayed on the lucky draw's page may be blown using a microphone of the client, and a lucky draw's result is obtained after the balloon is burst. Compared to existing technologies associated with lucky drawings using paper, the example lucky drawings provided in the present disclosure save a large amount of paper and are more pro-environmental. Furthermore, a user can participate in a lottery game using a mobile device such as a mobile phone. This is more convenient and makes the lottery game more interesting.

Apparently, any product implementing the present disclosure does not need to possess all the aforementioned advantages at the same time.

DETAILED DESCRIPTION

In order to make the above objectives, features and advantages of the present disclosure easier and clearer to understand, a detailed description of the present disclosure is given hereinafter using a combination of accompanying figures and particular implementations.

The present disclosure provides a new method of accessing network information through a graphic code, which can dynamically configure a presentation result of the graphic code and directly display the presentation result of the graphic code to a client by matching the graphic code in a server. The graphic code may include a different kind of graphic codes including a 2-dimensional code, a barcode, etc.

An implementation process of the method disclosed in the present disclosure is described in details using the following embodiments.

Figure 2:
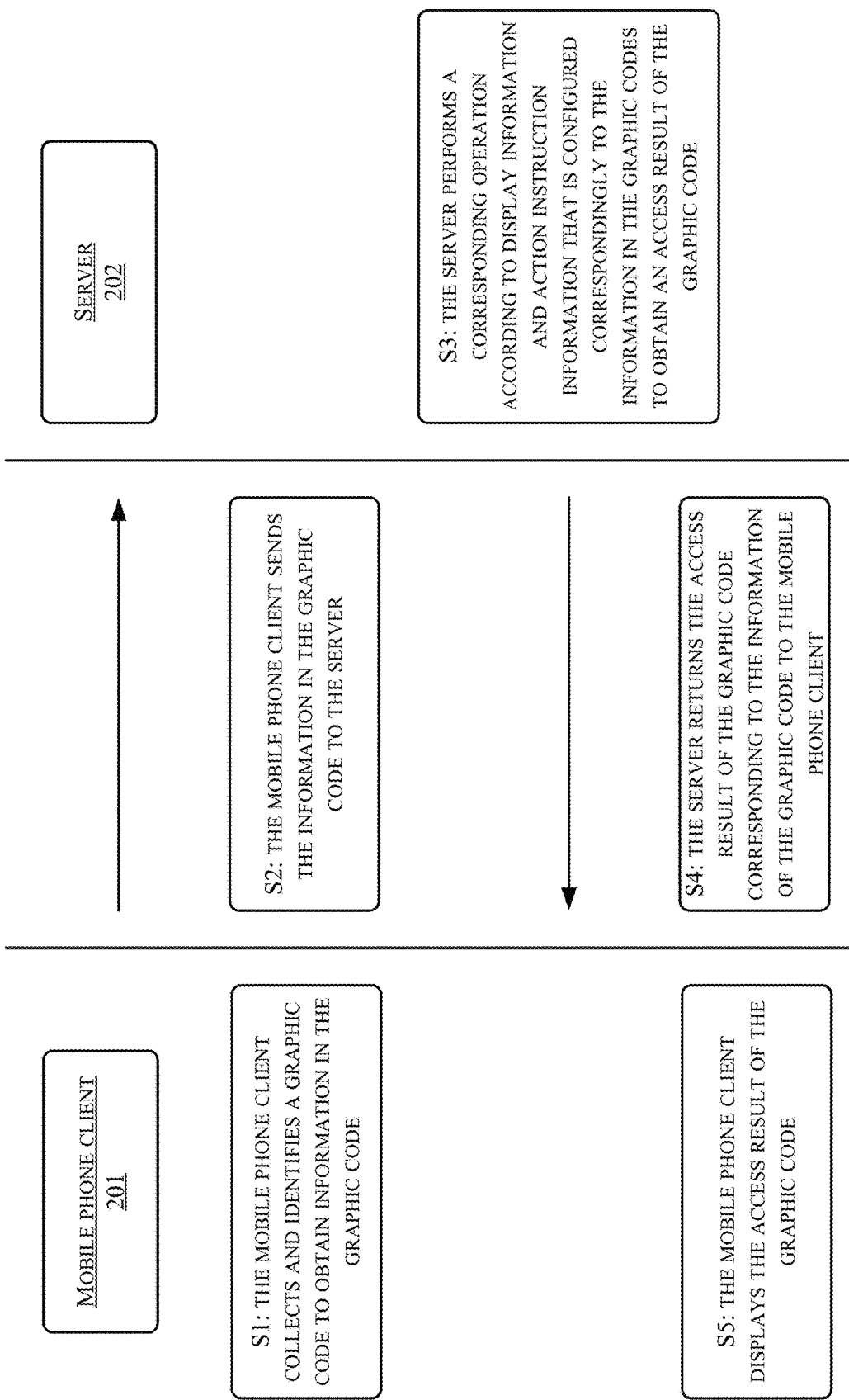
FIG. 2 is a logical diagram of realizing an access using a graphic code in accordance with exemplary embodiments of the present disclosure.

FIG. 2 is a logical diagram of realizing an access through a graphic code in accordance with the embodiments of the present disclosure.

A client therein may be an apparatus such as a mobile phone, a tablet computer, etc. In this embodiment, a mobile phone client 201 is used as an example for illustration.

At block S1, the mobile phone client 201 collects and identifies a graphic code to obtain information in the graphic code (also abbreviated as "graphic code information").

At block S2, the mobile phone client sends the information of the graphic code to a server.

At block S3, the server performs a corresponding action according to display information and action instruction information that is configured in correspondence with the information of the graphic code to obtain an access result of the graphic code.

At block S4, the server returns the access result of the graphic code corresponding to the information of the graphic code to the mobile phone client.

At block S5, the mobile phone client presents the access result of the graphic code.

As described above, the present exemplary method involves inter-processing between the client and the server 202 to be completed. The processing of the client and the processing the server 202 are described in details hereinafter.

Figure 3:
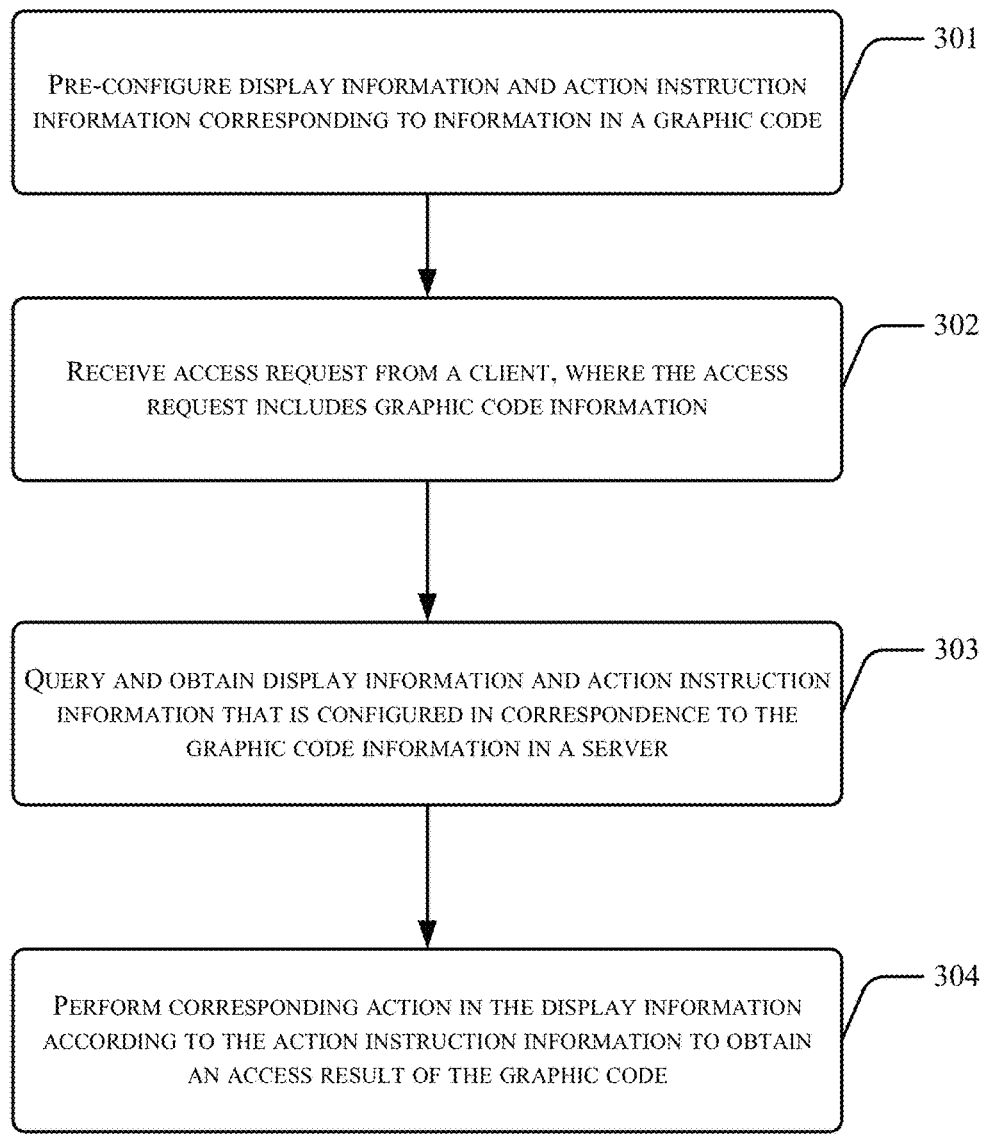
FIG. 3 is a flowchart of a process performed by a server to realize an access using a graphic code in accordance with exemplary embodiments of the present disclosure.

FIG. 3 is a flowchart of a server of realizing an access through a graphic code in accordance with the embodiments of the present disclosure.

Block 301 configures display information and action instruction information that corresponds to information in a graphic code in advance.

The information in the graphic code may be information corresponding to a website, a text, an image, etc.

The display information is a way of presenting information that is pointed to by the information of the graphic code. For example, when the information of the graphic code is information of a web address, whether a web page that is pointed to by this web address is a store homepage, a product detail page or an event page, etc. This web page can be of a different display.

The action instruction information is an action to be performed for certain display information. For example, an action corresponding to a store homepage may be to view that page or collect that page, etc. An action corresponding to a product detail page may be an action of adding to a shopping cart or adding to favorite, etc.

In a configuration of the server, information of each graphic code corresponds to a combination of display and action. For example, "URL1→ a product detail page+add to favorite" is one configuration. For information in a same graphic code, different combinations may be set up. For example, the above example URL1 may alternatively be set up as "URL1→ a product detail page+add to shopping cart". In other words, the same graphic code may be set up with different configurations of display and action.

However, in practical applications, only one corresponding configuration is normally set up in a same server based on application scenarios, while a different configuration may be set up for the same graphic code in another server. Otherwise, two different configurations corresponding to a same graphic code will exist in a same server. Under this situation, the server may distinguish different configurations based on identification of a client. For example, for mobile phone clients and a same graphic code, the configuration "URL1→ a product detail page+add to favorite" may be provided for use by users having mobile phone numbers within a certain number segment while the configuration "URL1→ a product detail page+add to shopping cart" may be provided to for use by users having mobile phone numbers within another number segment.

Block 302 receives an access request from a client, where the access request includes graphic code information.

The graphic code information is information obtained after the client identifies the graphic code, such as web site information.

Block 303 queries and obtains display information and action instruction information that is configured in correspondence with the graphic code information of the access request in the server.

Block 304 performs a corresponding action in the display information according to the action instruction information to obtain an access result of the graphic code.

The server performs a corresponding operation according to the display information and the action instruction information that is set up in correspondence with the information of the graphic code to obtain an access result of the graphic code, and returns the access result of the graphic code to the client.

The corresponding operation to be performed corresponds to: if the information of the graphic code sent from the client is URL1 and a corresponding configuration in the server is "URL1→ a product detail page+add to favorite", performing an operation of adding the product detail page pointed to by URL1 to the favorite by the server, and returning an access result of the graphic code—"add product to favorite"—to the client.

Figure 4:
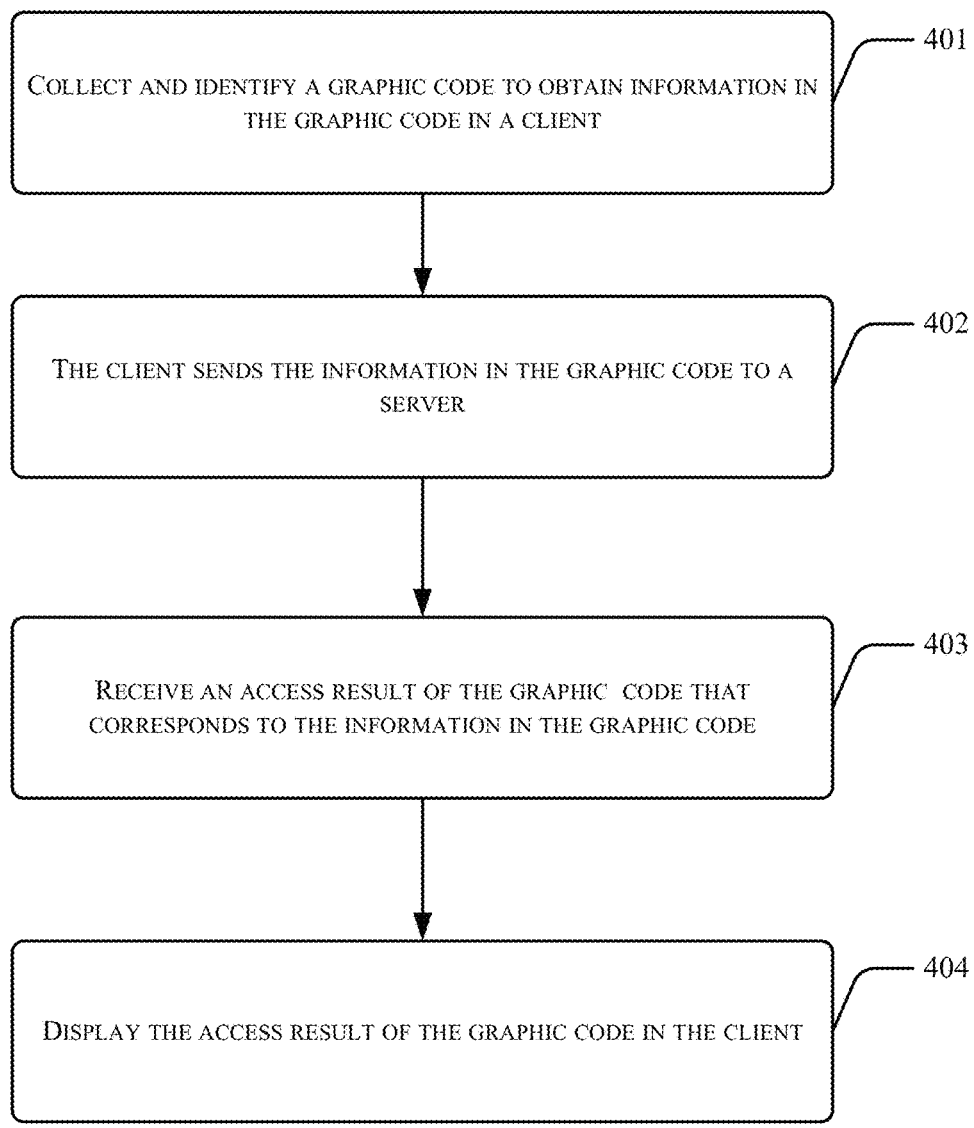
FIG. 4 is a flowchart of a process performed by a client to realize an access using a graphic code in accordance with exemplary embodiments of the present disclosure.

FIG. 4 is a flowchart of a client of realizing an access through a graphic code in accordance with the embodiments of the present disclosure.

Block 401 collects and identifies a graphic code at the client to obtain information of the graphic code.

The client may be a mobile phone client or any other client that is equipped with an image input device or photoelectric scanning device and installed with a software of decoding graphic code. The image input device or the photoelectric scanning device can be used to collect the graphic code, and the decoding software can be used to identify the information of the graphic code.

The graphic code may be a graphic code printed on media, such as newspapers, magazines, advertisements, books, packages, business cards, etc., or a graphic code on a web page that is displayed by a browser. The user can take a photo of the graphic code displayed on the web page and identify the graphic code using a camera of the mobile phone.

At block 402, the client sends the information of the graphic code to the server.

Block 403 receives an access result of the graphic code corresponding to the information of the graphic code from the server.

The server has obtained the access result of the graphic code after performing a corresponding operation according to the display information and the action information that is set up in correspondence with the information of the graphic code.

Block 404 displays the access result of the graphic code in the client.

According to the embodiments shown in FIGS. 2, 3 and 4, some operations may need to be associated with a user account based on different configurations of display and action. For example, a favorite folder for which a user needs to be known for an operation of adding a product detail page pointed to by URL1 to the favorite folder. However, some operations are not necessarily to be associated with a user account. For example, whether to know a client for which a user is not crucial for display for an operation of displaying a product detail page pointed to by URL1 to the client.

For the above situations where a user account is needed to be associated with operations, a correspondence relationship between the access result and a login account may be stored in the server after obtaining the access result of the graphic code. The present embodiment provides two types of handling approaches:

The first type is to send the login account to the server by the client, and to have the server log into the account, perform a corresponding operation according to the display information and the action instruction information that is set up in correspondence with the information of the graphic code, and store a correspondence relationship between the access result and the login account in the server.

The client may perform a login before scanning and collecting the graphic code, or perform a re-login after scanning and collecting the graphic code. When logging in, the server verifies the login account. After being logged in, the client includes the login account in a request each time when sending the request to the server. As such, the server can perform operations corresponding to the login account, e.g., adding the product detail page that is pointed to by URL1 to a user A's favorite folder, adding the product detail page that is pointed to by URL2 to a user B's favorite folder.

The second type is to create a correspondence relationship between an identification of the client and the login account in the server. The client sends the identification of the client to the server, and the server performs a corresponding operation according to the display information and the action instruction information that is set up in correspondence with the information of the graphic code, and store a correspondence relationship between the access result and the login account in the server.

For a mobile phone client, the server can create a correspondence relationship of a mobile phone number or a mobile phone SIM card identification number with the login account. As such, the server can identify the client that sends the request by querying the correspondence relationship without requiring the client to send the login account. However, in practical applications, because of factors such as frequent changes in mobile phone numbers of users or difficult acquisition of mobile phone SIM card identification numbers, stable correspondence relationships are relatively difficult to be created in the server. Consequently, the first approach is generally used. However, the second approach may be implemented if conditions are met. The present disclosure has no limitations thereon.

In addition, in practical applications, there is a situation that the above server may use one server, two servers or multiple servers to complete the process in FIG. 3. If only one server is used, all actions of setting up display and action instructions and corresponding operations to be performed based on the configurations are to be completed in this one server. If two or more servers are used, e.g., one server is responsible for maintenance of configurations and graphic codes, and another server is responsible for specific transaction implementations, such as adding to a favorite folder, adding to a shopping cart, etc., based on division of transactions. At that time, the present embodiment has the following additional processes:

if a server that receives the information of the graphic code is X, a server that performs corresponding operations according to the display information and the action instruction information is Y, and X and Y are not the same server, the following process may further be performed before the server Y receives the access result of the graphic code that corresponds to the information of the graphic code:

the client receives the display information and the action instruction information that is set up in correspondence with the information of the graphic code from the server X, and requests the server Y to perform corresponding operations according to the display information and the action instruction information.

In other words, the server X can send configuration information corresponding to the information of the graphic code to the client. The client can read the display information and the action instruction information after analyzing the configuration information, and send a corresponding request to the server Y according to the display information and the action instruction information. The server Y performs corresponding operations according to the display information and the action instruction information, and upon performing the operations, returns the access result of the graphic code to the client. In the meantime, the server stores the correspondence relationship between the access result and the login account. As can be seen, this is an operation initiated by the client.

Alternatively, there is another handling approach: the server X sends the display information and the action instruction information that is set up in correspondence with the information of the graphic code to the server Y. The server Y performs the corresponding operations according to the display information and the action instruction information, and stores the correspondence relationship between the access result and the login account. In this approach, the server performs the corresponding operations automatically without going through the client.

Based on the aforementioned description, the field of electronic commerce is used as an example for comparison between the present disclosure and the existing technologies below.

Figure 5:
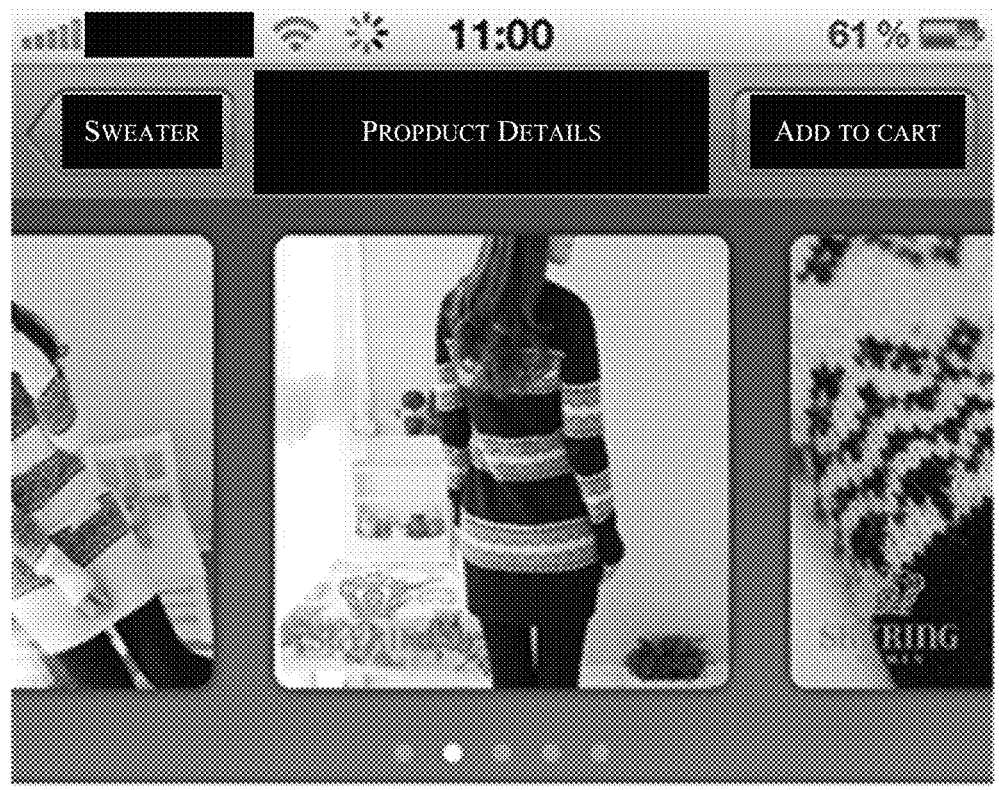
FIG. 5 is a schematic diagram of accessing an online shop using a graphic code in accordance with existing technologies.
Figure 5:
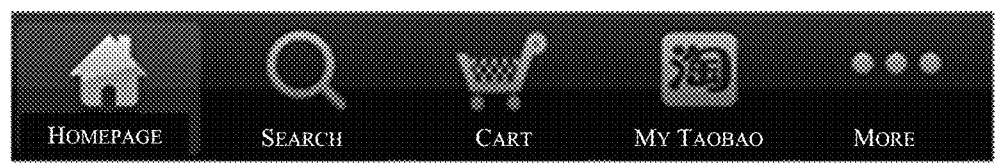

FIG. 5 shows a schematic diagram of accessing an online shop through an graphic code in existing technologies.

Figure 1:
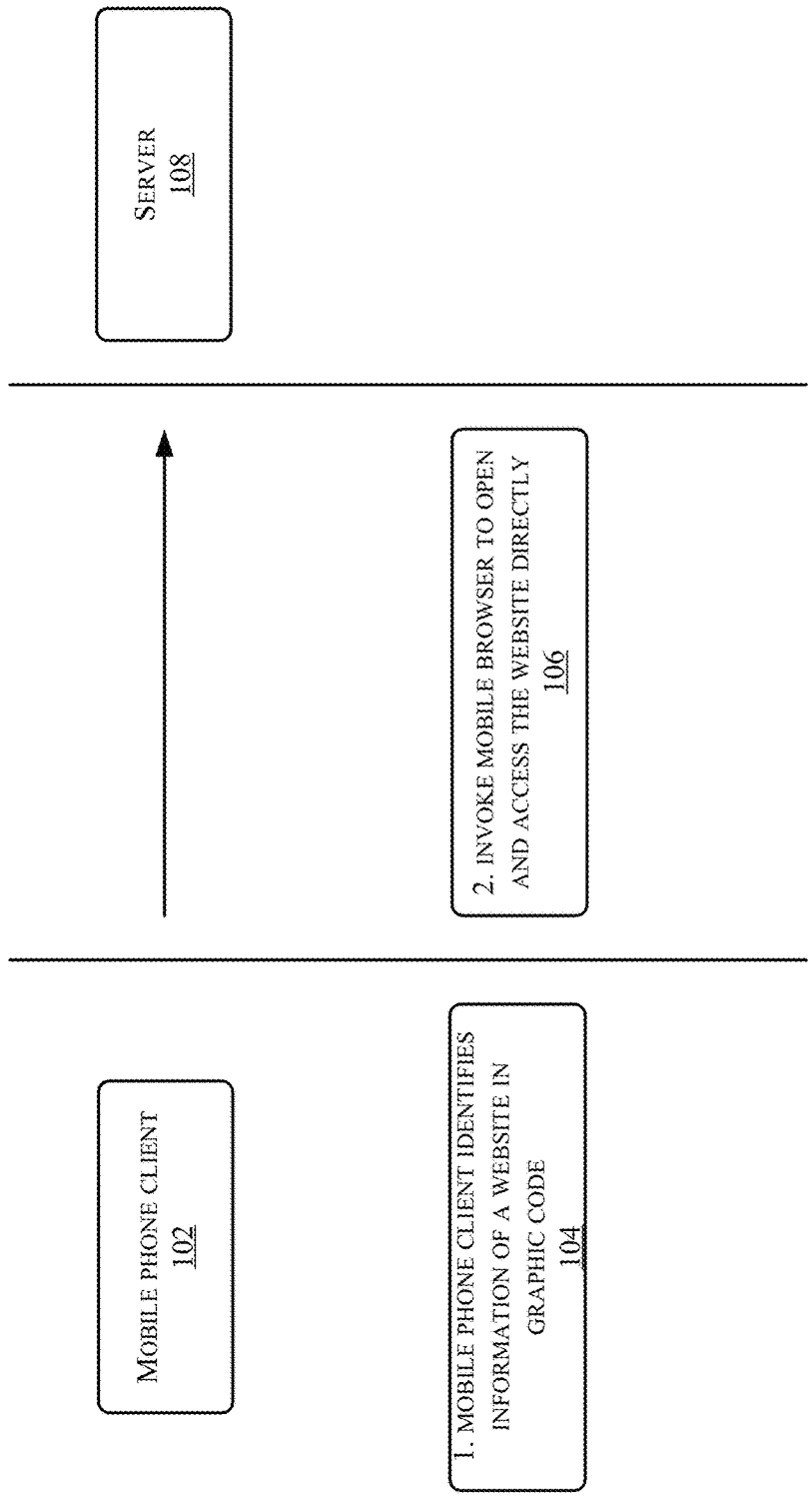
FIG. 1 is a logical diagram of realizing an access using a graphic code in accordance with existing technologies.

According to the access logic shown in FIG. 1, after the user scans a certain graphic code using a mobile phone, the mobile phone directly invokes a mobile browser to open and access a URL included in the graphic code. The server returns content pointed to by the URL to the mobile phone. FIG. 5 shows a product detail page. Upon reviewing, the user may click a button of "adding to shopping cart" on the upper right corner of the mobile phone's screen to add that product to his/her shopping cart.

Figure 6:
FIG. 6 is a schematic diagram of accessing an online shop using a graphic code in accordance with exemplary embodiments of the present disclosure.

FIG. 6 shows a schematic diagram of accessing an online shop through a graphic code in accordance with the embodiments of the present disclosure.

According to the access logic shown in FIG. 2, a graphic code is displayed on a computer screen. The decoding software in the mobile phone will automatically identify a URL included in the graphic code when the user uses a camera of the mobile phone and places the graphic code within the rectangle and at a location that is about 10 centimeter from the camera. Thereafter, the mobile phone sends the identified URL to the server. A configuration corresponding to that URL in the server is to add the product to the shopping cart. Therefore, the server automatically performs an operation of adding the product to the shopping cart after receiving the URL, and returns an access result of the graphic code—"Add to Shopping Cart"—to the mobile phone for presentation.

Figure 7:
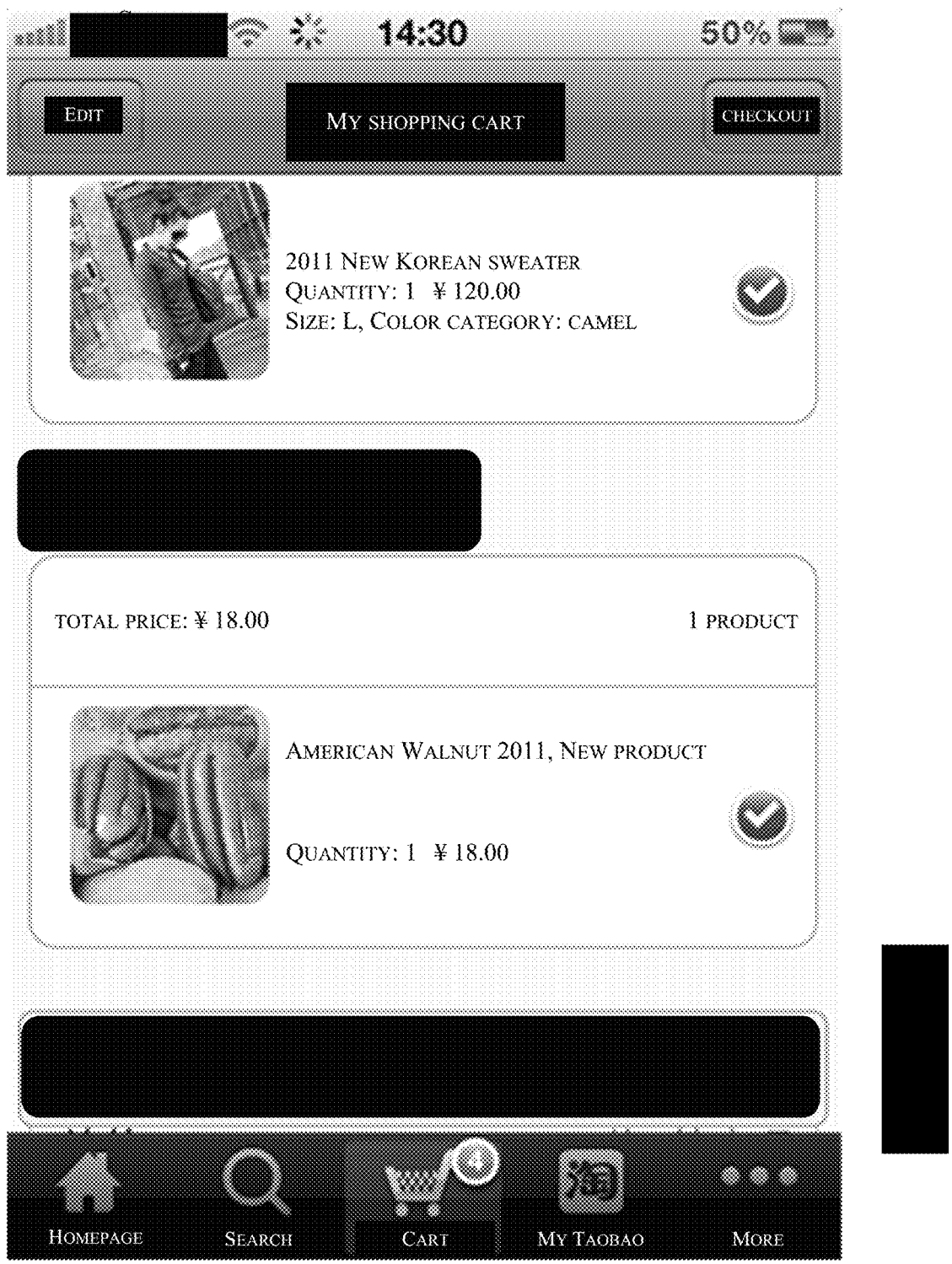
FIG. 7 is a schematic diagram of a unified checkout of an online transaction in accordance with exemplary embodiments of the present disclosure.

As such, after using the exemplary method of this disclosure, a presentation result of "Add to Shopping Cart" will be displayed after the mobile phone scans the graphic code, instead of a product detail page as shown in FIG. 5. By comparing between the two, the embodiment shown in FIG. 6 does not require the user to perform each click operation step-by-step in order to get the access result of the graphic code. Further, if the user selects and purchases multiple products through graphic codes, he/she only needs to scan the graphic codes to add all these products to the shopping cart and then proceeds to checkout as shown in FIG. 7. The user does not need to go to product detail pages to click respective buttons of "Add to Shopping Cart" one by one in accordance with the existing technologies. Therefore, the embodiment shown in FIG. 6 simplifies the process of online shopping operations.

Other than the foregoing embodiments, the present disclosure can be applied to other areas. Several examples are given below for demonstration but should not be construed as limitations of the present disclosure.

Display information may be various kinds of web page information, and corresponding action instruction information may be at least one of "view", "follow", "add to favorite", and "add to shopping cart". As described above, if many different action instruction information is configured, the different action instruction information can be distinguished using an identification of the client (e.g., a login account).

Example 1

Information of a graphic code is information of a certain website address, and that website address points to a homepage of a certain store, a corresponding configuration set up by the server is as follows:

display information is information of the homepage of the store; and action instruction information may be "view", "follow", "add to favorite", or "add to shopping cart".

In certain application scenarios, if the corresponding action instruction information is "view store's homepage", an action to be performed is to present web page content of the store's homepage, and a corresponding access result of the graphic code is the web page content of the store's homepage, i.e., what is displayed on the mobile phone's screen is the web page content of the store's homepage.

In certain application scenarios, if the corresponding action instruction information is "add to favorite", an action to be performed is to add the store into a favorite folder, and a corresponding access result of the graphic code is "add store to favorite". In other words, the server directly adds the store's homepage to the user's favorite folder and returns words—"add store to favorite"—to the mobile phone's screen for display.

In certain application scenarios, if the corresponding action instruction information is "follow the store's homepage", an action to be performed is to set up related push information of the store's homepage, and a corresponding access result of the graphic code is "follow the store's homepage". In other words, the server directly adds the store into the user's customized list. If there is any related push information (e.g., information such as product updates, store activities, etc.), this information will be sent to the client directly. Furthermore, words—"follow the store's homepage" are returned to the mobile phone's screen for display.

Example 2

Information of a graphic code is information of a website address, and the website address points to a detail page of a product, a corresponding configuration set up by the server is:

display information is product detail information;

action instruction information is "view product detail's page", "add to shopping cart", or "add to favorite".

In certain application scenarios, if the corresponding action instruction information is "view product detail's page", an action to be performed is to present web page content of the product detail's page, and a corresponding access result of the graphic code is the web page content of the product detail's page. In other words, what is displayed in the mobile phone's screen is the web page content of the product detail's page.

In certain application scenarios, if the corresponding action instruction information is "add to shopping cart", an action to be performed is to add the product into the shopping cart, and a corresponding access result of the graphic code is "add to shopping cart". In other words, the server adds the product to the user's shopping cart and returns words—"add to shopping cart"—to the mobile phone's screen for display.

In certain application scenarios, if the corresponding action instruction information is "add to favorite", an action to be performed is to add the product into the favorite folder, and a corresponding access result of the graphic code is "add product to favorite". In other words, the server adds the product to the user's favorite folder and returns words—"add product to favorite"—to the mobile phone's screen for display.

In short, the present exemplary embodiment simplifies user operations and enhances the efficiency of obtaining an access result of a graphic code after a user scans the graphic code. Furthermore, the server only needs to perform corresponding operations display information and action instruction information that is pre-configured for information in the graphic code which is sent from the client, without waiting for step-by-step operation requests from the user. Therefore, a handling process of the server is also simplified.

In addition, this method of directly returning an access result of a graphic code to the client fulfills an intention of the graphic code's publisher. For example, an intention of a product seller who publishes a graphic code of a certain product is to hope that more buyers will purchase the product. As such, the seller sets up a configuration of "URL1→ product detail's page+add to shopping cart" in the server when he/she publishes the graphic code. In this way, the user can automatically add the product to the shopping cart when he/she uses a mobile phone to scan the graphic code.

Given the foregoing description, the present disclosure further provides another implementation: the server sends the found display information and action instruction information to the client, and the client performs the corresponding operation in the display information according to the action instruction information to get the access result of the graphic code. Specific details are shown in FIG. 8.

Figure 8:
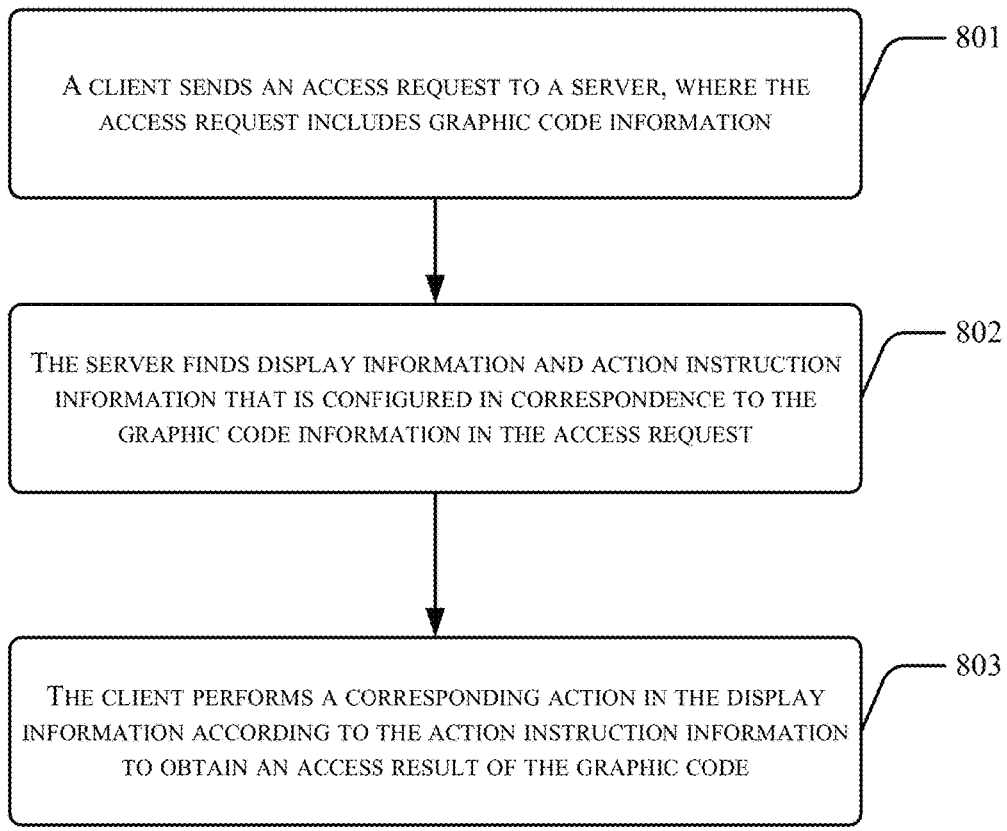
FIG. 8 is a flowchart of a process performed by a client to realize an access using a graphic code in accordance with other exemplary embodiments of the present disclosure.

FIG. 8 illustrates a flowchart of a client for realizing an access through a graphic code in accordance with another embodiment of the present disclosure.

At block 801, the client sends an access request to a server, where the access request includes graphic code information.

At block 802, display information and action instruction information, which is found in the server and is configured in correspondence with the graphic code information in the access request, is received.

At block 803, the client performs a corresponding action in the display information according to the action instruction information to obtain an access result of the graphic code.

Optionally, the access request of the client may further include information of a login account. The client sends the access result to the server to store a correspondence relationship between the access result and the login account in the server.

The information in the graphic code may be information of a website address, and the website address points to an event page. The event page may be a page associated with product promotion, a page associated with lucky draw, a page associated with game participation, a page associated with information promulgation, a page associated with an advertisement, etc. Accordingly, the correspondingly configured action instruction information that is set up by the server may be at least one of a touch operation, an accelerometer operation and a microphone operation. As described above, if information of multiple action instructions is configured, identification of the client (e.g., a login account) may be used to distinguish therebetween.

Figure 9:
FIG. 9 is a schematic diagram of performing a scratch lotto using a mobile phone's touch screen in accordance with exemplary embodiments of the present disclosure.
Figure 10:
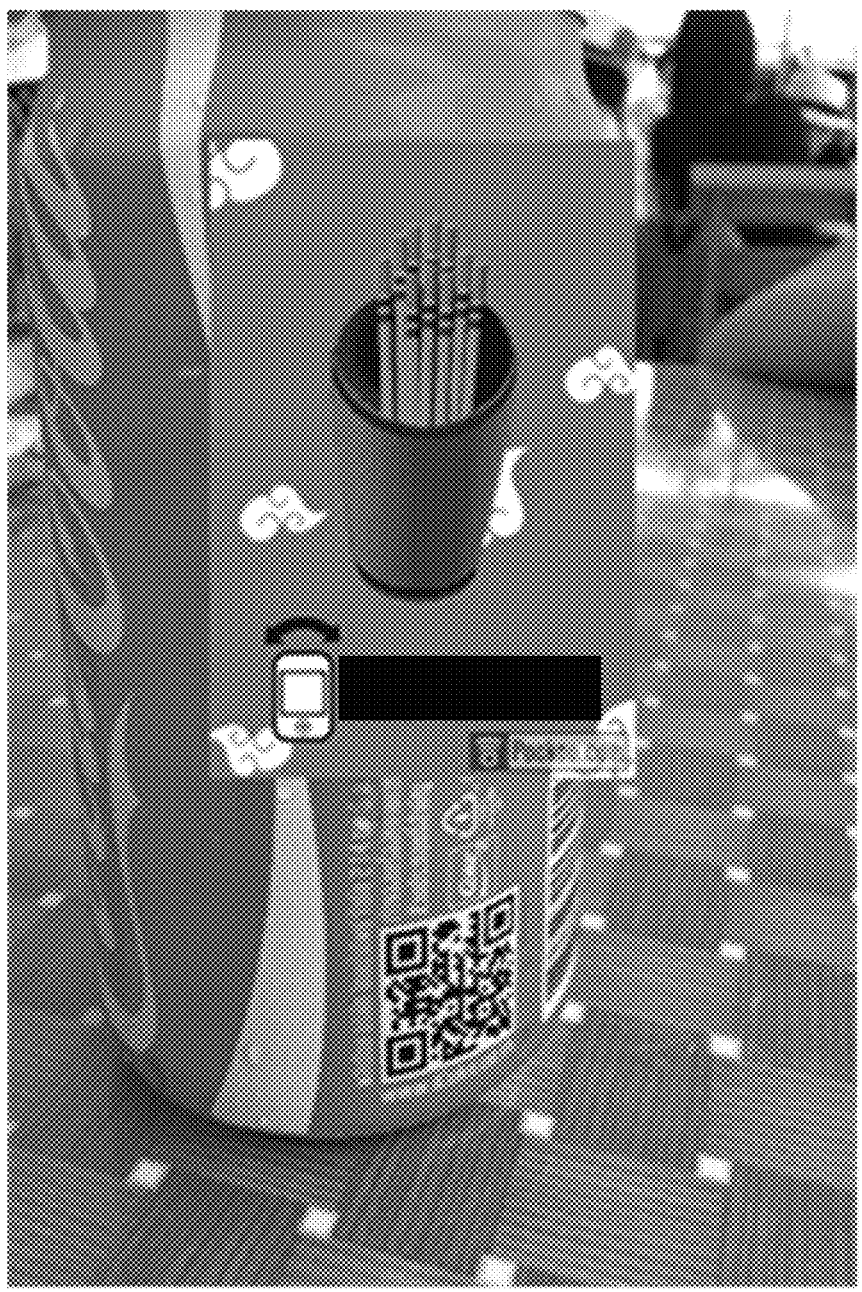
FIG. 10 is a schematic diagram of performing a lottery using a mobile phone's G-sensor in accordance with exemplary embodiments of the present disclosure.

The way of presenting content of an event page that is in a form of a web page is the same as that for a normal web page. FIGS. 5 and 7 show web pages that are displayed in a mobile phone client. For an event page that is in a form of a card, the method of displaying a card page is used, as shown in FIGS. 8, 9 and 10.

Figure 11:
FIG. 11 is a schematic diagram of performing a lucky draw using a mobile phone's microphone in accordance with exemplary embodiments of the present disclosure.

The method shown in FIG. 8 can be used in a lucky draw event. In existing technologies, after scanning a graphic code associated with a lucky draw, a "graphic code identification client" opens a browser to access a website associated with the lucky draw to participate in the lucky draw. However, when the exemplary method of this disclosure is used, display scenarios appearing in card-type event pages as shown in FIGS. 9, 10 and 11 may be obtained directly within a scene of a camera based on information of a graphic code. Specific details are as follows:

Display information is page information of a scratch lotto, and correspondingly configured action instruction information is a touch operation within a scratch lotto region.

Upon receiving touch information within the scratch lotto area, the client obtains an access result of the scratch lotto's page based on the touch information within the scratch lotto region.

Specifically, a result of scratch lotto is obtained and displayed through a touch operation on a scratch lotto region of an event page displayed by a touch screen of the client. As shown in FIG. 9, a displayed scenario that is obtained within a scene of a camera may present a scratch card of a scratch lotto, in which a scratch lotto region is set up. The user may scratch the "scratch lotto region" and determine a result of whether the scratch lotto is won by making use of a touch-screen property of the mobile phone.

Display information is page information of a lottery, and correspondingly configured action instruction information is G-sensor operation.

Upon receiving G-sensor information, the client obtains an access result of the lottery's page based on the G-sensor information.

Specifically, the client is shaken according to the instruction information on the lottery's page, and a lottery result is obtained and displayed from the server using the G-sensor. As shown in 10, a displayed scenario that is obtained within a scene of the camera may present instruction information of "shake iPhone". The user may see a result of the lottery after using the G-sensor of the mobile phone to shake the mobile phone.

When using the G-sensor to shake the mobile phone, the G-sensor of the mobile phone can be activated by shaking the mobile phone according to the instruction information. Upon receiving the G-sensor information of the mobile phone, the server sends the lottery result to the mobile phone client for display. Furthermore, a threshold for the G-sensor may be set. G-sensor information is sent to the server only when a value of the G-sensor during shaking the mobile phone exceeds the threshold, thereby avoiding unintentional operations of the user.

Display information is page information of a lucky draw, and correspondingly configured action instruction information is a microphone operation.

Upon receiving microphone information, the client obtains an access result of the lucky draw's page based on the microphone information.

Specifically, the microphone of the client is used to blow a balloon shown on the lucky draw's page, and a lucky draw result is obtained and displayed after the balloon bursts. As shown in FIG. 11, a displayed scenario that is obtained within a scene of the camera may present a balloon. The user uses the microphone of the mobile phone to blow the balloon, and can see a lucky draw result after the balloon is burst.

Furthermore, a blow threshold may be set. The balloon is burst only when the strength or time of blowing by the user exceeds the threshold, thereby avoiding an unintentional operation of the user.

Compared to existing technologies associated with lucky drawings using paper, the above methods of lucky drawings save a large amount of paper and are more pro-environmental. Furthermore, a user can participate in a lottery game using a mobile device such as a mobile phone, which is more convenient and makes the lottery game more interesting.

Based on the above description, a graphic code's access is realized by using a mobile phone client. However, in practical applications, certain mobile phone clients do not use web page presentation for Wap web pages when displaying web page content such as product detail's page or store's homepage, but use web page presentation methods that are specifically developed for mobile devices such as mobile phones. Therefore, after scanning a graphic code associated with product details and performing recognition, the client only knows that an associated recognition result is a URL web address, but does not know to which product's details this URL is corresponding.

Therefore, an exemplary embodiment may further include the following additional handling process for a mobile phone client:

receiving product identification information that corresponds to the information of the graphic code from the server, and obtaining and presenting related data from the server based on the product identification information by the client.

When the client sends the identified URL to the server, the server returns an id of that product and a default action (e.g., presenting the product's details, adding to favorite, adding to shopping cart, etc.). As such, if the user has any subsequent operation, such as proceeding to checkout after multiple products have been added to the shopping cart, the client may obtain the related data based on the product id and display thereof in a localized page.

The foregoing embodiments are described in the context of electronic commerce, but can also be applied to other fields in actual applications. Their implementation principles are similar to those of the foregoing embodiments, and are therefore not redundantly described herein.

It should be noted that, for the sake of description, the foregoing embodiments are described as a sequence of actions. However, one skilled in the art should understand that the present disclosure is not limited to the above described order of actions because certain blocks may be performed in a different order or concurrently based on the present disclosure. Furthermore, one skilled in the art should also understand that the embodiments described in this disclosure are merely example embodiments. Actions that are involved therein may not necessarily be essential to the disclosed methods.

Figure 12:
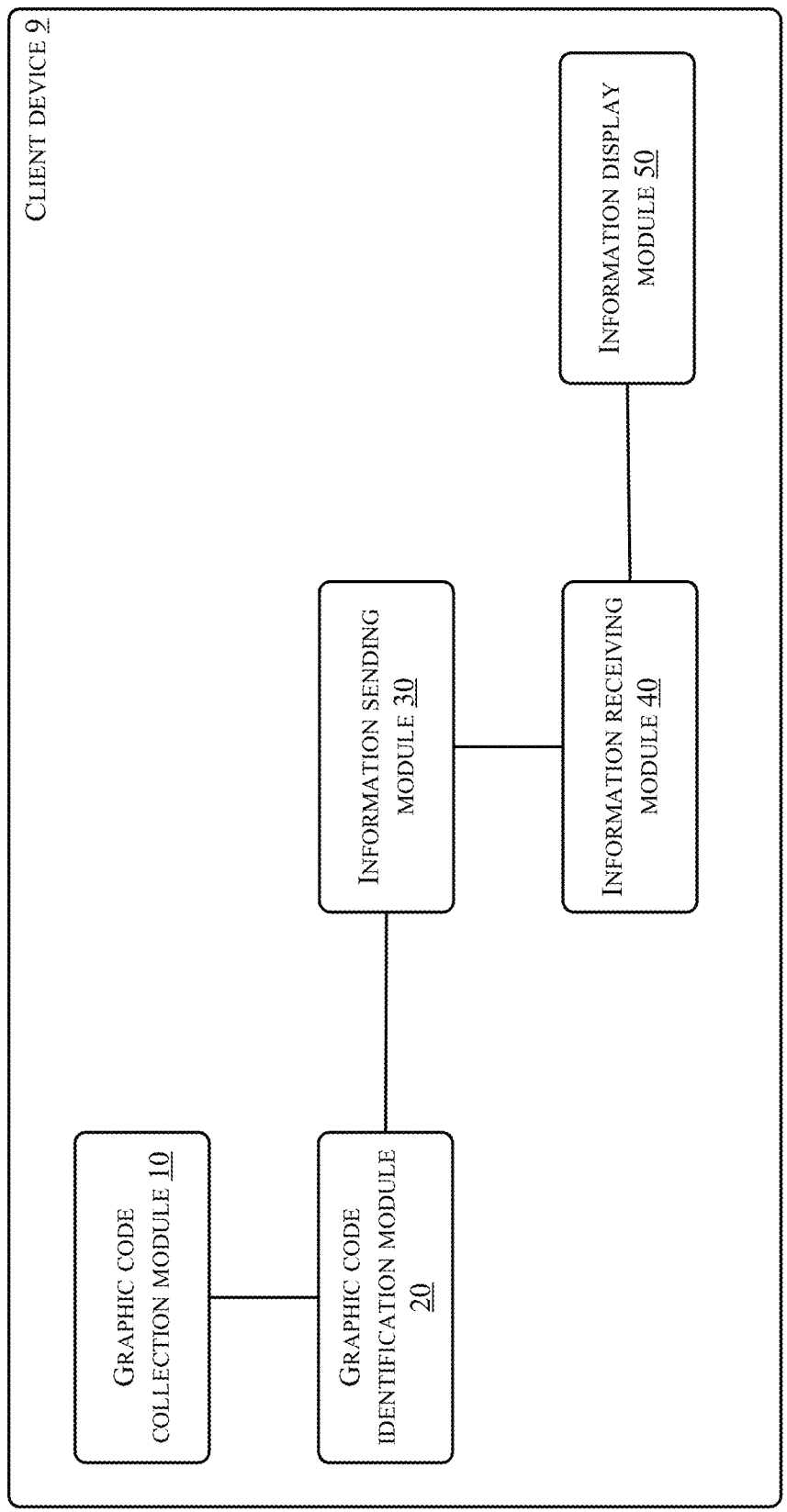
FIG. 12 is a structural diagram of a client device of accessing a network through a graphic code in accordance with exemplary embodiments of the present disclosure.
Figure 13:
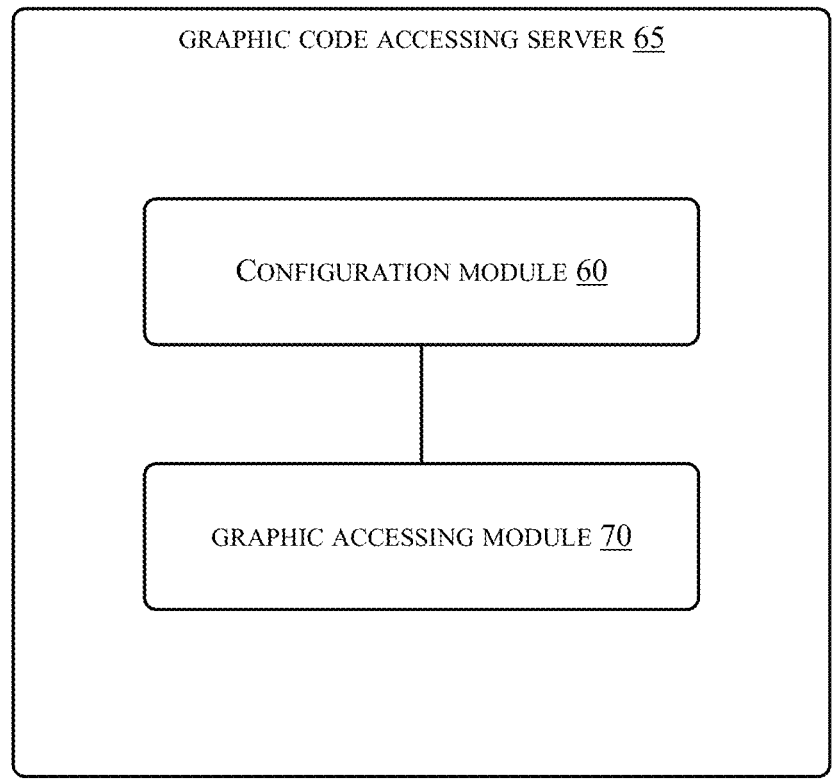
FIG. 13 is a structural diagram of a graphic code accessing a server in accordance with exemplary embodiments of the present disclosure.
Figure 14:
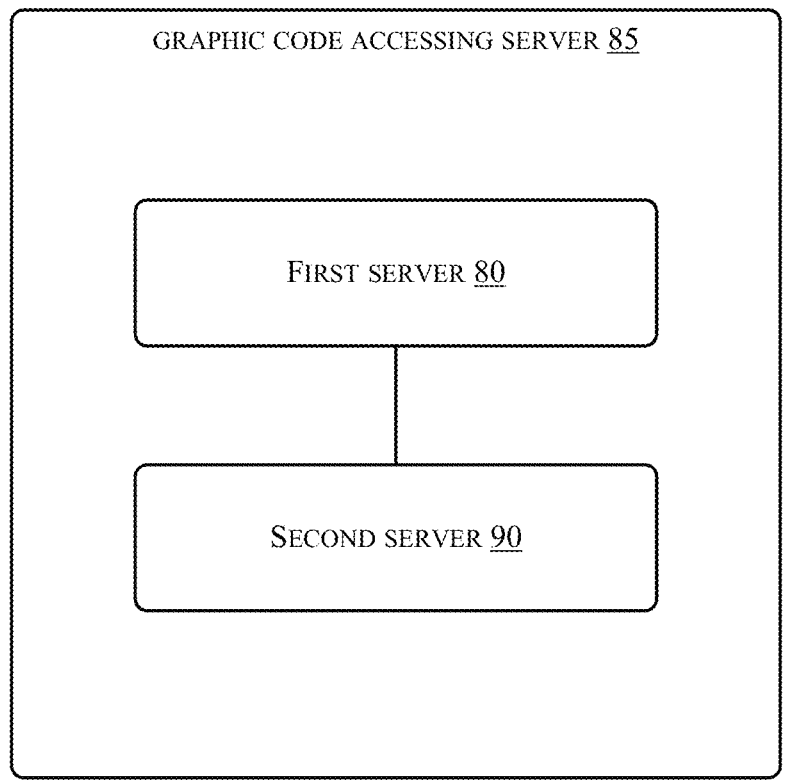
FIG. 14 is a structural diagram of a graphic code accessing a server in accordance with other exemplary embodiments of the present disclosure.

Based on the description of the exemplary methods shown in FIGS. 2-7, the present disclosure further provides corresponding exemplary client device and server, which are shown in FIGS. 12, 13 and 14 respectively.

FIG. 12 is a structural diagram of a client device 9 of network access through a graphic code in accordance with the embodiments of the present disclosure.

The client device 9 may include the following modules:

a graphic code collection module 10 used for collecting a graphic code;

a graphic code identification module 20 used for identifying the collected graphic code and obtaining information of the graphic code;

an information sending module 30 used for sending the information in the graphic code to a server;

an information receiving module 40 used for receiving an access result of the graphic code that corresponds to the information in the graphic code from the server, where the server obtains the access result of the graphic code after performing corresponding operations according to display information and action instruction information that is configured in correspondence with the information of the graphic code; and an information display module 50 used for displaying the access result of the graphic code.

Optionally, when operations of the server need to be associated with the user's account, the information sending module 30 may further be used to send a login account to the server. Corresponding to the login account, the server performs corresponding operations according to the display information and the action instruction information that is configured in correspondence with the information of the graphic code.

Optionally, when the server that receives the graphic code information is X, and the server that performs the corresponding operations according to the display information and the action instruction information is Y, and X is a server different from Y, the information receiving module 40 may further be used to receive the display information and the action instruction information that is configured in correspondence with the information of the graphic code from the server X and request the server Y to perform corresponding operations according to the display information and the action instruction information.

The display information and the action instruction information can be configured based on real application scenarios. Below shows a few configurations:

The display information is "store's homepage information";

if the corresponding action instruction information is "view store's homepage", a corresponding access result of the graphic code is a web page content of the store's homepage;

if the corresponding action instruction information is "add to favorite", a corresponding access result of the graphic code is "add store to favorite";

if the corresponding action instruction information is "follow the store's homepage", a corresponding access result of the graphic code is "follow the store's homepage".

the display information is "product detail information";

if the corresponding action instruction information is "view product detail page", a corresponding access result of the graphic code is web page content of the product detail page;

if the corresponding action instruction information is "add to shopping cart", a corresponding access result of the graphic code is "add product into shopping cart";

if the corresponding action instruction information is "add to favorite", a corresponding access result of the graphic code is "add product into favorite folder".

the display information is event page information;

if the corresponding action instruction information is "view event page", a corresponding access result of the graphic code is web page content of the event in a form of a web page;

if the corresponding action instruction information is "view card-type event page", a corresponding access result of the graphic code is web page content of the event in a form of a card.

In one embodiment, the information receiving module 40 may further be used to receive product identification information corresponding to the information of the graphic code from the server and obtain related data from the server based on the product identification information.

FIG. 13 illustrates a structural diagram of a server of graphic code access in accordance with the embodiments of the present disclosure.

The graphic code accessing server 65 may include the following modules:

a configuration module 60 used for pre-configuring display information and action instruction information corresponding to information of graphic codes;

a graphic code accessing module 70 used for receiving information of a graphic code sent from a client, obtaining an access result of the graphic code after performing a corresponding operation according to display information and action information that is configured in correspondence with the information of the graphic code, and returning the access result of the graphic code to the client.

Optionally, when operations of the server need to be associated with an account of a user, the graphic code accessing module 70 may further perform the corresponding operation according to the display information and the action instruction information that is configured in correspondence with the information of the graphic code and corresponding to a login account at the client.

Further, the graphic code accessing server 65 may alternatively be implemented with multiple servers, as shown in FIG. 14. FIG. 14 is a structural diagram of a server of graphic code access in accordance with another embodiment of the present disclosure.

The graphic code accessing server 85 may include:

a first server 80 used for pre-configuring display information and action instruction information corresponding to information of graphic codes, receiving information of a graphic code from a client, and sending correspondingly configured display information and action instruction information to the client;

a second server 90 used for receiving the display information and the action instruction information from the client, getting an access result of the graphic code after performing a corresponding operation according to the display information and the action information that is configured in correspondence with the information of the graphic code, and returning the access result of the graphic code to the client.

Alternatively, the first server 80 may directly send the corresponding display information and the action instruction information to the second server 90.

For the foregoing embodiments of a client device and a graphic code access server, respective descriptions are relatively simple due to their similarities to the exemplary method embodiments as shown in FIGS. 2-7. Relevant description can be found in corresponding parts of the method embodiments.

Figure 15:
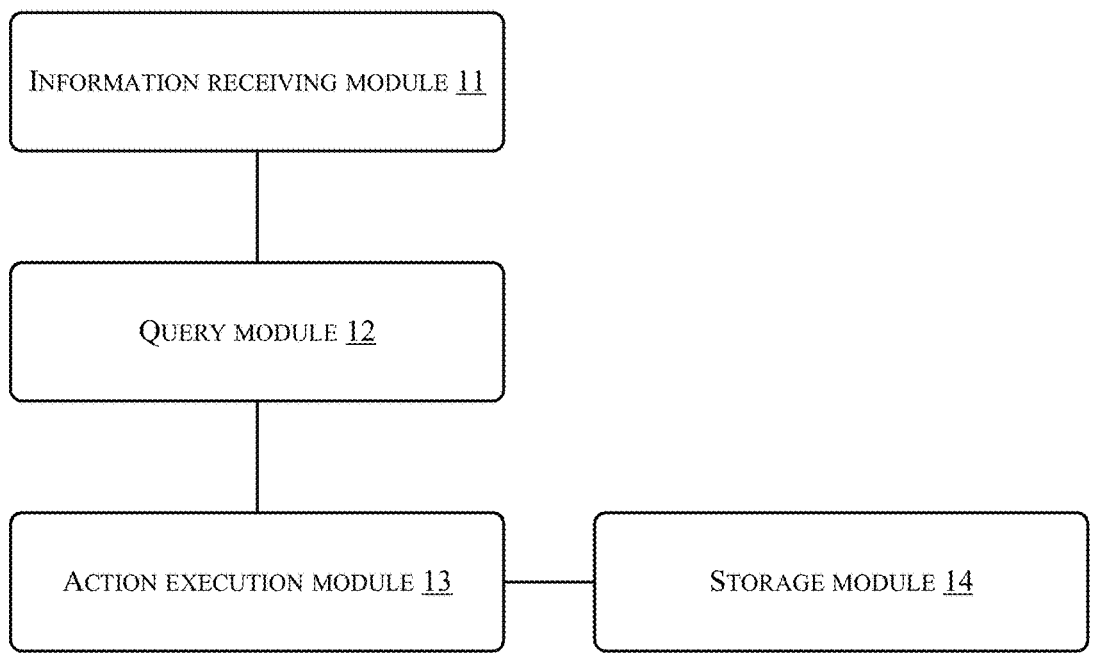
FIG. 15 is a structural diagram of a server of accessing a network through a graphic code in accordance with other exemplary embodiments of the present disclosure.
Figure 16:
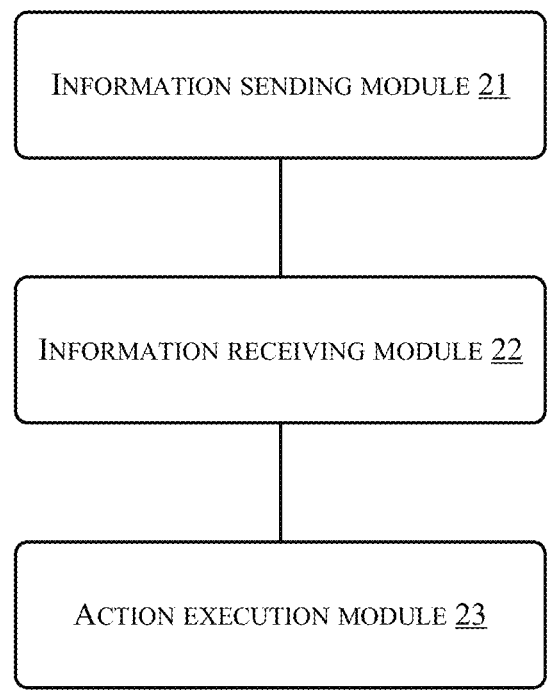
FIG. 16 is a structural diagram of a client device of accessing a network through a graphic code in accordance with other exemplary embodiments of the present disclosure.

Based on the method embodiments shown in FIGS. 8-11, the present disclosure further provides corresponding exemplary embodiments of a client device and a server, as shown in FIGS. 15 and 16.

FIG. 15 is a structural diagram of a server of network access through a graphic code in accordance with another embodiment of the present disclosure.

The server may include the following modules:

an information receiving module 11 used for receiving an access request from a client, where the access request includes information of a graphic code;

a query module 12 used for querying and obtaining display information and action instruction information corresponding to the information of the graphic code of the access request in a server; and an action execution module 13 used for performing a corresponding action in the display information according to the action instruction information to obtain an access result of the graphic code.

In one embodiment, the access request of the client may further include information of a login account. Correspondingly, the server may further include the following module:

a storage module 14 used for storing a correspondence relationship between the access result and the login account in the server after obtaining the access result of the graphic code.

The display information may be web page information, and the correspondingly configured action instruction information may be at least one of "view", "follow", "add to favorite", and "add to shopping cart".

FIG. 16 is a structural diagram of a client device of network access through a graphic code in accordance with another embodiment of the present disclosure.

The client device may include the following modules:

an information sending module 21 used for sending an access request to a server, where the access request includes information of a graphic code;

an information receiving module 22 used for receiving display information and action instruction information that is found in the server and is configured in correspondence with the information of the graphic code in the access request; and an action execution module 23 used for performing a corresponding action in the display information according to the action instruction information to obtain an access result of the graphic code.

In one embodiment, the access request of the client may further include information of a login account. The information sending module 21 may further be used for sending the access result to the server to store a correspondence relationship between the access result and the login account in the server.

The display information is event page information; and the corresponding action instruction information may be at least one of a touch operation, a gravity sensing operation and a microphone operation.

For the foregoing embodiments of a client and a server, respective descriptions are relatively simple due to their similarities to the exemplary method embodiments as shown in FIG. 8. Relevant description can be found in corresponding parts of the method embodiment.

All the embodiments of the present disclosure are described in a progressive manner. What is emphasized in each embodiment is different from those of other embodiments. Same or similar parts of embodiments can be cross-referenced with one another.

Above are detailed descriptions of methods, systems and client devices of network accesses through graphic codes that are provided by the present disclosure. The present description employs specific embodiments to illustrate the principles and implementations of the present disclosure. The above descriptions of the embodiments are merely used for helping to understand the methods and respective core concepts of the present disclosure. Further, based on the concepts in this disclosure, one of ordinary skills in the art may make modifications to the specific embodiments and application scopes. In short, content of the present disclosure should not be construed as limitations to the present disclosure.

Figure 17:
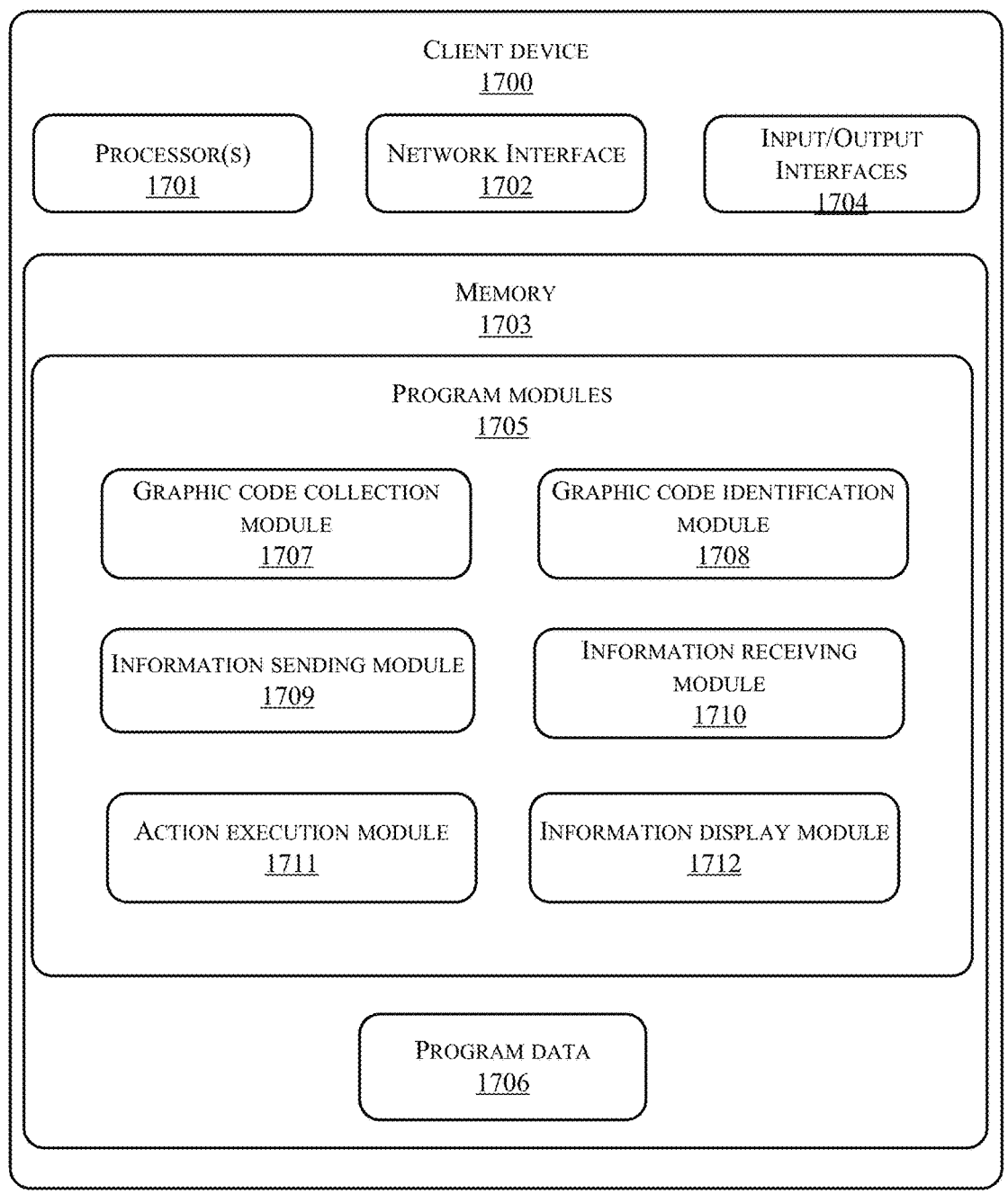
FIG. 17 is a structural diagram of the example client device as described in FIGS. 12 and 16.

For example, FIG. 17 illustrates an exemplary client device 1700, such as the client devices as described above, in more detail. In one embodiment, the client device 1700 can include, but is not limited to, one or more processors 1701, a network interface 1702, memory 1703, and an input/output interface 1704.

The memory 1703 may include computer-readable media in the form of volatile memory, such as random-access memory (RAM) and/or non-volatile memory, such as read only memory (ROM) or flash RAM. The memory 1703 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 1703 may include program modules 1705 and program data 1706. In one embodiment, the program modules 1705 may include a graphic code collection module 1707, a graphic code identification module 1708, an information sending module 1709, an information receiving module 1710, an action execution module 1711, and an information display module 1712. Details about these program modules thereof may be found in the foregoing embodiments described above.

Figure 18:
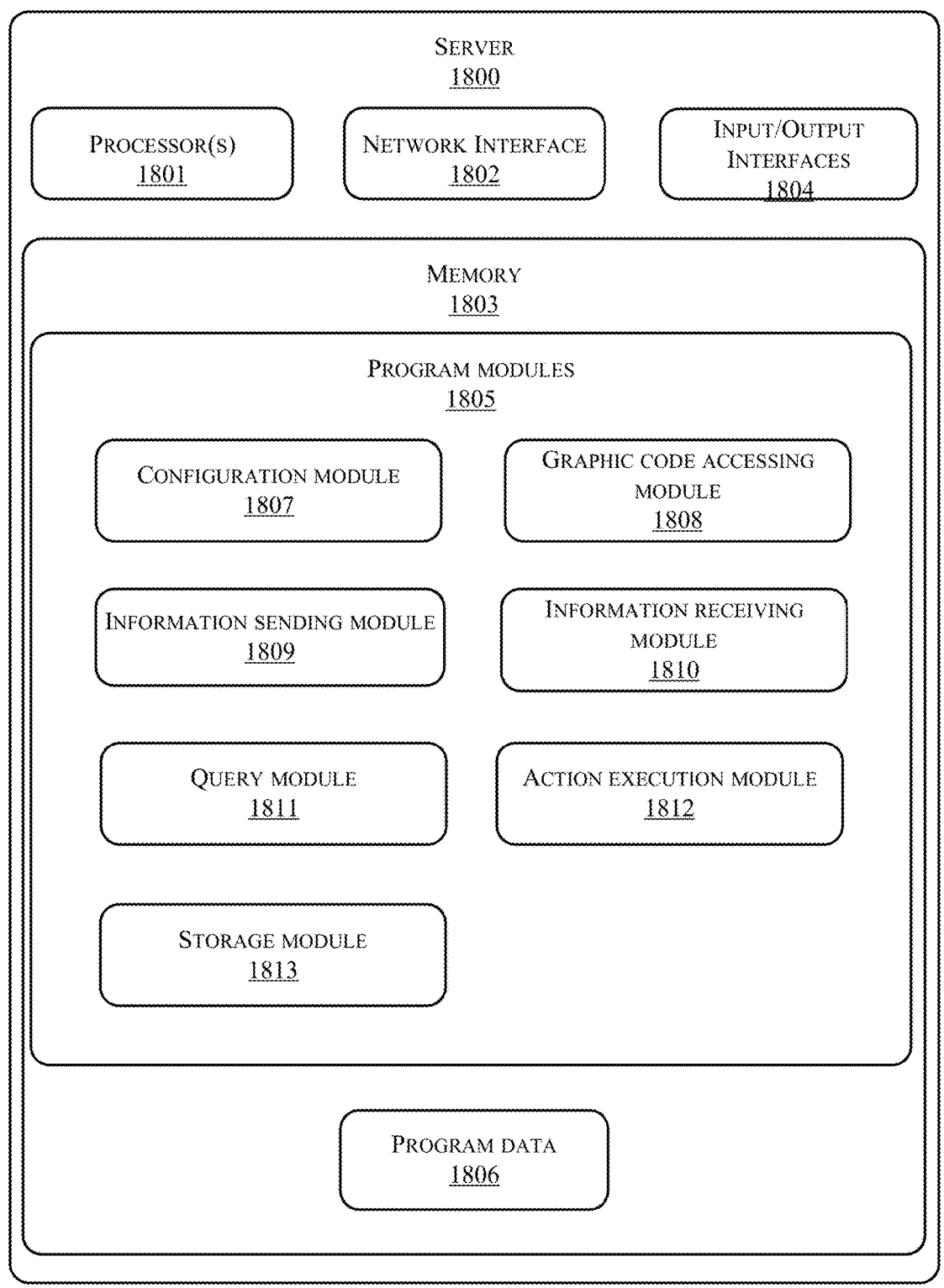
FIG. 18 is a structural diagram of the example server as described in FIGS. 13-15.

Furthermore, FIG. 18 illustrates an exemplary server 1800, such as the servers as described above, in more detail. In one embodiment, the server 1800 can include, but is not limited to, one or more processors 1801, a network interface 1802, memory 1703, and an input/output interface 1804.

The memory 1803 may include computer-readable media in the form of volatile memory, such as random-access memory (RAM) and/or non-volatile memory, such as read only memory (ROM) or flash RAM. The memory 1803 is an example of computer-readable media.

The memory 1803 may include program modules 1805 and program data 1806. In one embodiment, the program modules 1805 may include a configuration module 1807, a graphic code accessing module 1808, an information sending module 1809, an information receiving module 1810, a query module 1811, an action execution module 1812, and a storage module 1813. Details about these program modules thereof may be found in the foregoing embodiments described above.

What is claimed is:

1. A method comprising:
receiving an access request from a client, wherein the access request includes information of a graphic code, the information of the graphic code corresponding to a particular combination of display information and action instruction information;
querying and obtaining the particular combination of display information and action instruction information from among a plurality of different combinations of display information and action instruction information;
performing a corresponding action according to the particular combination of display information and action instruction information to obtain an access result of the graphic code; and
storing a correspondence relationship between the access result and a login account in the server after obtaining the access result of the graphic code.

2. The method of claim 1, wherein the graphic code comprises a two-dimensional code or a barcode.

3. The method of claim 1, wherein the corresponding action is performed further in correspondence with the login account.

4. The method of claim 1, further comprising configuring the plurality of different combinations of display information and action instruction information to correspond to a plurality of graphic codes.

5. The method of claim 4, wherein each of the plurality of graphic codes corresponds to a different one of the plurality of different combinations.

6. The method of claim 1, further comprising distinguishing the particular combination of display information and action instruction information from among the plurality of different combinations of display information based on identification of the client and the information of the graphic code.

7. A client device comprising:
one or more processors;
memory;
an information sending module stored in the memory and executable by the one or more processors to send an access request to a server, wherein the access request includes information of a graphic code, the information of the graphic code corresponding to a particular combination of display information and action instruction information;
an information receiving module stored in the memory and executable by the one or more processors to receive the particular combination of display information and action instruction information that corresponds to the information of the graphic code in the access request from the server; and
an action execution module stored in the memory and executable by the one or more processors to perform a corresponding action according to the particular combination of display information and action instruction information to obtain an access result of the graphic code, wherein the information sending module is further configured to send the access result to the server to cause a correspondence relationship between the access result and a login account to be stored in the server.

8. The client device of claim 7, further comprising a graphic code collection module to collect the graphic code.

9. The client device of claim 8, wherein the graphic code collection module comprises at least one of an image input device or a scanning device.

10. The client device of claim 7, further comprising a graphic code identification module to identify the graphic code and obtain the information of the graphic code.

11. The client device of claim 7, wherein the graphic code comprises a two-dimensional code or a barcode.

12. The client device of claim 7, wherein the particular combination of display information and action instruction information received by the information receiving module is further in correspondence with the login account.

13. The client device of claim 7, wherein the client device comprises a mobile device configured with at least one of an image input device or a scanning device for collecting the graphic code.

14. The client device of claim 7, further comprising a screen for presenting the access result of the graphic code.

15. One or more computer-readable media storing executable instructions that, when executed by one or more processors, cause the one or more processors to perform acts comprising:
receiving an access request from a client, wherein the access request includes information of a graphic code, the information of the graphic code corresponding to a particular combination of display information and action instruction information;
querying and obtaining the particular combination of display information and action instruction information from among a plurality of different combinations of display information and action instruction information;
performing a corresponding action according to the particular combination of display information and action instruction information to obtain an access result of the graphic code; and
storing a correspondence relationship between the access result and a login account in the server after obtaining the access result of the graphic code.

16. The one or more computer-readable media of claim 15, wherein the graphic code comprises a two-dimensional code or a barcode.

17. The one or more computer-readable media of claim 15, wherein the corresponding action is performed further in correspondence with the login account.

18. The one or more computer-readable media of claim 15, the acts further comprising configuring the plurality of different combinations of display information and action instruction information to correspond to a plurality of graphic codes.

19. The one or more computer-readable media of claim 18, wherein each of the plurality of graphic codes corresponds to a different one of the plurality of different combinations.

20. The one or more computer-readable media of claim 15, the acts further comprising distinguishing the particular combination of display information and action instruction information from among the plurality of different combinations of display information based on identification of the client and the information of the graphic code.

* * * * *